(12) United States Patent
Lin et al.

(10) Patent No.: US 8,307,923 B2
(45) Date of Patent: Nov. 13, 2012

(54) MOBILE PLATFORM

(75) Inventors: Pei-Chun Lin, Taipei (TW); Shuan-Yu Shen, Taoyuan County (TW)

(73) Assignee: National Taiwan University, Taipei (TW)

( * ) Notice: Subject to any disclaimer, the term of this patent is extended or adjusted under 35 U.S.C. 154(b) by 410 days.

(21) Appl. No.: 12/719,869

(22) Filed: Mar. 9, 2010

(65) Prior Publication Data
US 2011/0100733 A1    May 5, 2011

(30) Foreign Application Priority Data
Oct. 29, 2009  (TW) .............................. 98136678 A (51) Int. Cl.
*B62D 51/06* (2006.01)
(52) U.S. Cl. ............................................ 180/8.3; 901/1
(58) Field of Classification Search .................. 180/8.3, 180/8.1, 8.2, 8.6, 8.5, 199; 901/1, 8, 14
See application file for complete search history.

(56) References Cited

U.S. PATENT DOCUMENTS

| | | | | |
|---|---|---|---|---|
| 5,267,888 A * | 12/1993 | Hippely et al. | ............... | 446/465 |
| 5,626,506 A * | 5/1997 | Halford et al. | ................ | 446/465 |
| 6,502,657 B2 * | 1/2003 | Kerrebrock et al. | .......... | 180/218 |
| 6,939,197 B1 * | 9/2005 | Hoeting | ......................... | 446/437 |
| 7,017,687 B1 * | 3/2006 | Jacobsen et al. | ............... | 180/8.3 |
| 7,836,983 B2 * | 11/2010 | Setrakian et al. | .............. | 180/8.3 |
| 8,083,013 B2 * | 12/2011 | Bewley et al. | ................. | 180/8.3 |
| 8,197,298 B2 * | 6/2012 | Willett | .......................... | 446/164 |
| 2009/0200090 A1 * | 8/2009 | Takanishi et al. | ............. | 180/8.6 |

FOREIGN PATENT DOCUMENTS

| | | |
|---|---|---|
| TW | 195883 | 12/1992 |
| TW | M333405 | 6/2008 |
| TW | M353196 | 3/2009 |
| TW | M355867 | 5/2009 |

OTHER PUBLICATIONS

Shen et al., Design of a Leg-Wheel Hybrid Mobile Platform, The 2009 IEEE/RSJ International Conference on Intelligent Robots and Systems Oct. 11-15, 2009 St. Louis, USA.

* cited by examiner

*Primary Examiner* — Tashiana Adams
(74) *Attorney, Agent, or Firm* — Jianq Chyun IP Office (57) ABSTRACT

A mobile platform including a body, hybrid leg-wheels and driving mechanisms is provided. The hybrid leg-wheels are disposed around the body for carrying the body moving on a working surface. The driving mechanisms are disposed between the corresponding hybrid leg-wheels and the body. Each driving mechanism includes a driving axle connecting the corresponding hybrid leg-wheels and the body. Each driving mechanism provides the corresponding hybrid leg-wheel a rotational degree of freedom and a translational degree of freedom, wherein the rotational degree of freedom and the translational degree of freedom are driven independently. The rotational degree of freedom allows the hybrid leg-wheels rotating along an axis of the driving axle, and the translational degree of freedom allows the hybrid leg-wheels translating relative to the driving axle, wherein the rotational direction is substantially perpendicular to the translational direction.

19 Claims, 9 Drawing Sheets

MOBILE PLATFORM

CROSS-REFERENCE TO RELATED APPLICATION

This application claims the priority benefit of Taiwan application serial no. 98136678, filed on Oct. 29, 2009. The entirety of the above-mentioned patent application is hereby incorporated by reference herein and made a part of specification.

BACKGROUND OF THE INVENTION

1. Field of the Invention

The present invention relates to a mobile platform. More particularly, the present invention relates to a leg-wheel hybrid mobile platform.

2. Description of Related Art

Along with the rapid development of technology, robots are widely used in our daily life.

In general, mobile platforms of robots include wheel-type mobile platforms and leg-type platforms. Wheel-type mobile platforms are characterized in stable and rapid movement, but still suffer in uneven and stepped terrains. Leg-type mobile platforms, in contrary, providing higher adaptability with respect to various terrains, have the drawbacks of slow walking speed, low stability and high energy consumption yet, and consequently restrict the practicability thereof.

SUMMARY OF THE INVENTION

The present invention is directed to a mobile platform, which can be switched into different motion modes in accordance with various terrains and moving requirements.

The present invention is directed to a mobile platform provided with simple mechanical design and capable of reducing fabricating cost thereof.

As embodied and broadly described herein, the present invention provides a mobile platform including a body, hybrid leg-wheels and driving mechanisms. The hybrid leg-wheels are disposed around the body for carrying the body moving on a working surface. The driving mechanisms are disposed between the corresponding hybrid leg-wheels and the body. Each driving mechanism includes a driving axle connecting the corresponding hybrid leg-wheels and the body. Each driving mechanism provides the corresponding hybrid leg-wheel a rotational degree of freedom and a translational degree of freedom, wherein the rotational degree of freedom and the translational degree of freedom are driven independently. The rotational degree of freedom allows the hybrid leg-wheels rotating along an axis of the driving axle, and the translational degree of freedom allows the hybrid leg-wheels translating relative to the driving axle, wherein the direction of the axis is substantially perpendicular to the translational direction.

According to an embodiment of the present invention, the above driving mechanism further comprises a first driver and a transmission module. The first driver is disposed on the body. The transmission module is connected between the first driver and the corresponding hybrid leg-wheel, wherein the first driver drives the hybrid leg-wheel to rotate through the transmission module.

According to an embodiment of the present invention, the above first driver is located beside the driving axle, and each transmission module comprises an active wheel, a passive wheel and a transmission unit. The active wheel is disposed at an output terminal of the corresponding first driver. The passive wheel is provided with a through hole, wherein the passive wheel connects the corresponding hybrid leg-wheel to drive the hybrid leg-wheel rotating. The transmission unit connects the active wheel and the passive wheel.

According to an embodiment of the present invention, the transmission unit comprises a belt, a chain, a gear or a wire rope.

According to an embodiment of the present invention, the above driving mechanism further comprises a sleeve and a coupler. The sleeve is connected to the transmission module and disposed around the driving axle, wherein the transmission module drives the sleeve rotating relative to the driving axle. The coupler is coupled to the corresponding hybrid leg-wheel and the sleeve, wherein the sleeve drives the hybrid leg-wheel rotating synchronously through the coupler, and the hybrid leg-wheel has the translational degree of freedom relative to the coupler.

According to an embodiment of the present invention, the mobile platform further comprises an interfacial component disposed between each coupler and the corresponding hybrid leg-wheel.

According to an embodiment of the present invention, the above interfacial component comprises a plurality of bearings respectively disposed on the couplers and leaned against the corresponding hybrid leg-wheels.

According to an embodiment of the present invention, the above bearings comprise ball bearings, cylindrical roller bearings, needle roller bearings or sliding bearings.

According to an embodiment of the present invention, the above driving mechanism further comprises a second driver and a transforming module. The second driver is disposed on the body and connected to the driving axle to drive the driving axle rotating. The transforming module is coupled between the corresponding hybrid leg-wheel and the driving axle for transforming the rotation of the driving axle into a linear translation of the hybrid leg-wheel relative to the driving axle.

According to an embodiment of the present invention, the above transforming module comprises a gear and a rack. The gear is connected to a terminal of the driving axle. The rack is disposed on the hybrid leg-wheel and engaged with the gear.

According to an embodiment of the present invention, the above hybrid leg-wheel comprises a rim segment and a spoke. The spoke is connected between the rim segment and the corresponding driving mechanism. The rotational degree of freedom allows the spoke rotating along the axis of the driving axle, and the translational degree of freedom allows the spoke translating relative to the driving axle.

According to an embodiment of the present invention, an extending direction of each spoke is substantially perpendicular to the axis of the driving axle.

According to an embodiment of the present invention, each rim segment comprises a first segment and a second segment. The rim segment can be switched to a wheel profile by expanding the first segment and the second segment to be coplanar, while the rim segment can be switched to a leg profile by retracting the first segment and the second segment with each other.

According to an embodiment of the present invention, the first segment and the second segment are respectively a semi-circular segment. The rim segment becomes a full circular rim as the wheel profile, while the rim segment becomes a semi-circular rim as the leg profile.

According to an embodiment of the present invention, two ends of the first segment are respectively pivoted to the two ends of the second segment. When the rim segment transforms between the leg profile and the wheel profile, the second segment rotates relative to the first segment along an axis passing through the two pivots.

According to an embodiment of the present invention, the second segment is slidably coupled to the first segment. When the rim segment transforms between the leg profile and the wheel profile, the second segment slides relative to the first segment along the outline of the first segment.

According to an embodiment of the present invention, the first segment and the second segment are expanded to form a rim having a closed profile, and two ends of the spoke are respectively located at an edge of the rim and a center of the rim.

According to an embodiment of the present invention, the first segment is fixed on the spoke, and each hybrid leg-wheel further comprises an actuator disposed on the spoke and connected to the second segment to drive the second segment moving relative to the first segment.

According to an embodiment of the present invention, the mobile platform further comprises a plurality of steering mechanisms, which are respectively disposed between the driving mechanisms and the body for adjusting an included angle between each hybrid leg-wheel and the corresponding driving axle.

The mobile platform of the present invention can be switched into wheel-motivation mode or leg-motivation mode in accordance with various terrains and moving requirements, which not only accomplishes stable and rapid movement on a plane but also provides high adaptability with respect to uneven terrains. Moreover, the hybrid leg-wheel is provided with a rotational degree of freedom and a translational degree of freedom, which are driven independently with simple mechanism design, and thus the production cost can be reduced.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
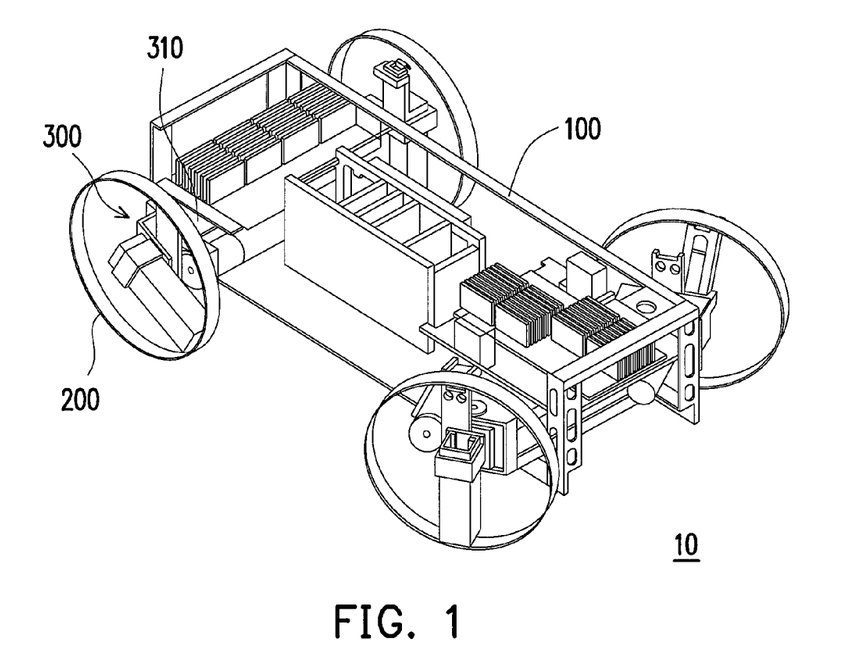
FIG. 1 is a schematic view showing a mobile platform being in a wheel-motivation mode according to an embodiment of the present invention.
Figure 2:
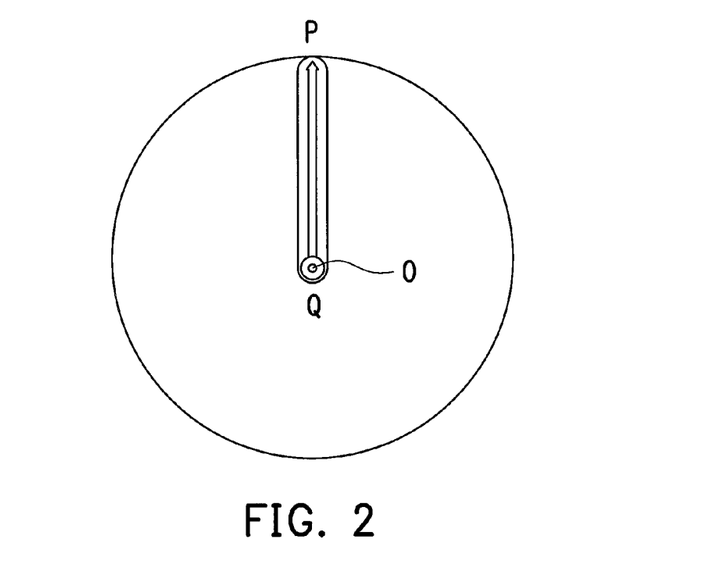
FIG. 2 shows an equivalent motion model of the hybrid leg-wheel operated in the wheel-motivation mode of FIG. 1.
Figure 3:
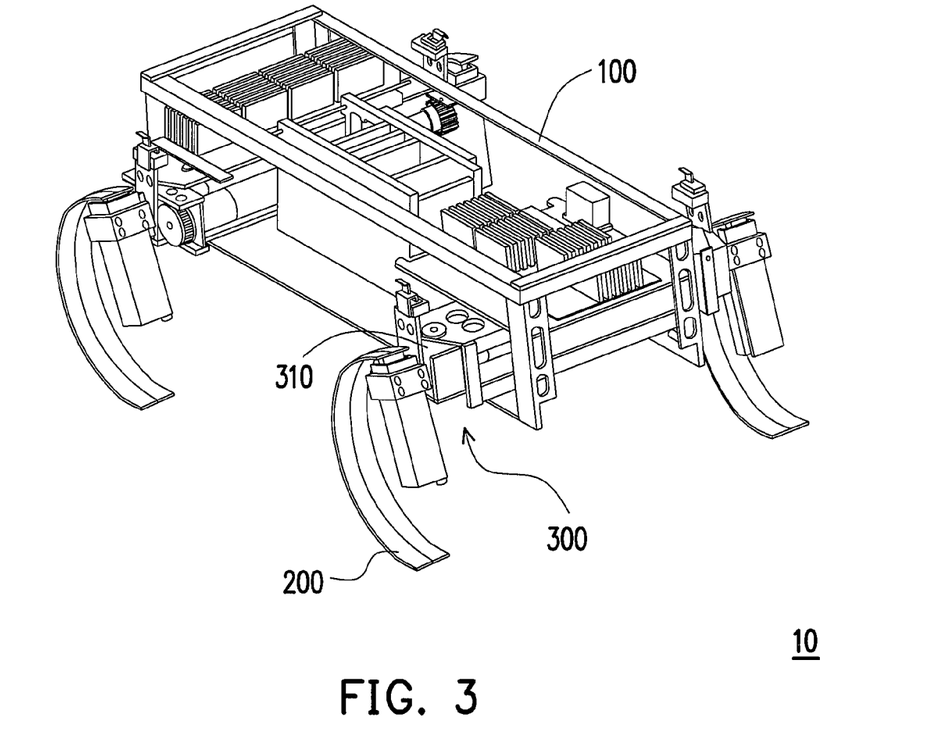
FIG. 3 is a schematic view showing a mobile platform being in a leg-motivation mode according to an embodiment of the present invention.
Figure 4:
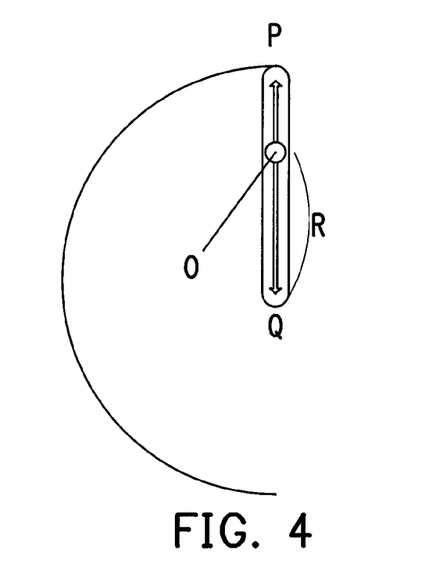
FIG. 4 shows an equivalent motion model of the hybrid leg-wheel operated in the leg-motivation mode of FIG. 3.

FIGS. 1 and 3 are schematic views showing a mobile platform being in respectively a wheel-motivation mode and a leg-motivation mode according to an embodiment of the present invention. In addition, FIG. 2 shows an equivalent motion model of the hybrid leg-wheel operated in the wheel-motivation mode of FIG. 1. FIG. 4 shows an equivalent motion model of the hybrid leg-wheel operated in the leg-motivation mode of FIG. 3.

Firstly, referring to FIGS. 1 and 3, the mobile platform 10 includes a body 100, a plurality of hybrid leg-wheels 200 and a plurality of driving mechanisms 300. Four hybrid leg-wheels 200 and four driving mechanisms 300 are presented in the illustrated embodiment as an example, wherein the four hybrid leg-wheels 200 are disposed around the body 100 to carry the body 100 moving on a work surface (not shown).

The four driving mechanism 300 are respectively disposed between the four hybrid leg-wheels 200 and the body, and a driving axle 310 of each driving mechanism 300 connects the corresponding hybrid leg-wheel 200 and the corresponding body, so as to provide the four hybrid leg-wheels 200 a rotational degree of freedom and a translational degree of freedom which are driven independently, and thereby drive the mobile platform 10 to move in the wheel-motivation mode of FIG. 1 as well as in the leg-motivation mode of FIG. 3. An axis of the driving axle 310 of the driving mechanism 300 is substantially perpendicular to the direction of linear translation.

According to other embodiments not shown herein, the quantity of the hybrid leg-wheels 200 and the corresponding driving mechanism 300 may be varied, for example the quantity can be adjusted to six, to meet requirements in application. To make a clear and more comprehensible illustration to those skilled in the art, detailed descriptions of mechanism and movement of a single hybrid leg-wheel 200 and its corresponding driving mechanism 300 are provided in the following embodiments.

To accomplish movement of the mobile platform 10 on different types of working surface, the hybrid leg-wheel 200 incorporates the rolling function of a wheel with the translation function of a leg. Referring to FIGS. 1 and 2, the rotational degree of freedom provided by the driving mechanism 300 drives the hybrid leg-wheel 200 rotating along the axis of the driving axle 310. Particularly, the point O in FIG. 2 being as a joint between the hybrid leg-wheel 200 and the driving axle 310 is coincident with the center Q of the hybrid leg-wheel 200. The hybrid leg-wheel 200 rotates along the axis of the driving axle 310 by taking the point O as a rotating center and the line segment PQ as a radius. At this time, the mobile platform 10 in the wheel-motivation mode can be carried by the hybrid leg-wheel 200 to move on an even work surface.

Referring to FIGS. 3 and 4, the translational degree of freedom provided by the driving mechanism 300 drives the hybrid leg-wheel 200 translating relative to the driving axle 310. Particularly, the point O in FIG. 4 being as a joint between the hybrid leg-wheel 200 and the driving axle 310 can move relative to the center Q along the line segment PQ, wherein a distance R between the point O and the center Q varies accordingly. At this time, the mobile platform 10 in the leg-motivation mode can be carried by the hybrid leg-wheel 200 upwardly or downwardly relative to the gravity direction, to move on an uneven work surface such as stairs.

More embodiments, which exemplarily illustrate the details of the driving mechanism providing the independent rotational and translational degree of freedoms to the hybrid leg-wheel, are further provided in the following. It is noted that the following embodiments are exemplary and thereby provides no limitation to the present invention. One of ordinary skill in the art may adopt other present techniques to obtain the same or similar effect according to the disclosure in the present application.

Figure 5:
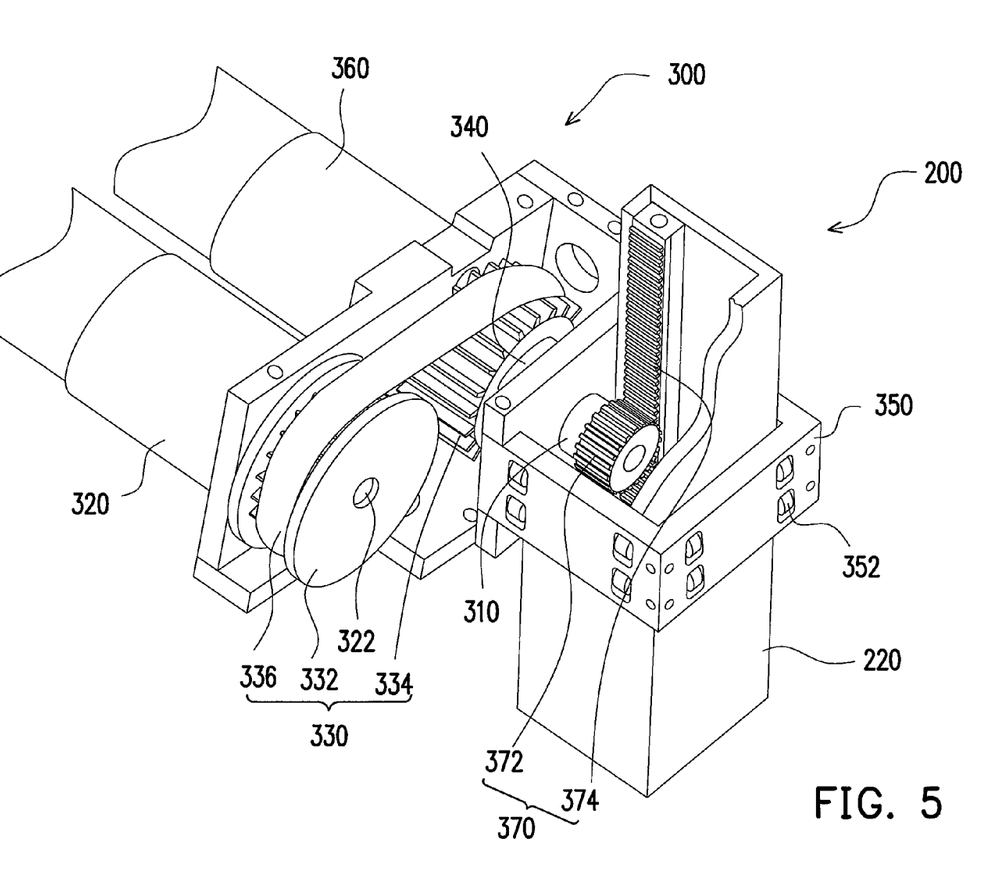
FIG. 5 is a schematic view showing a hybrid leg-wheel and a driving mechanism according to one embodiment of the present invention.
Figure 6:
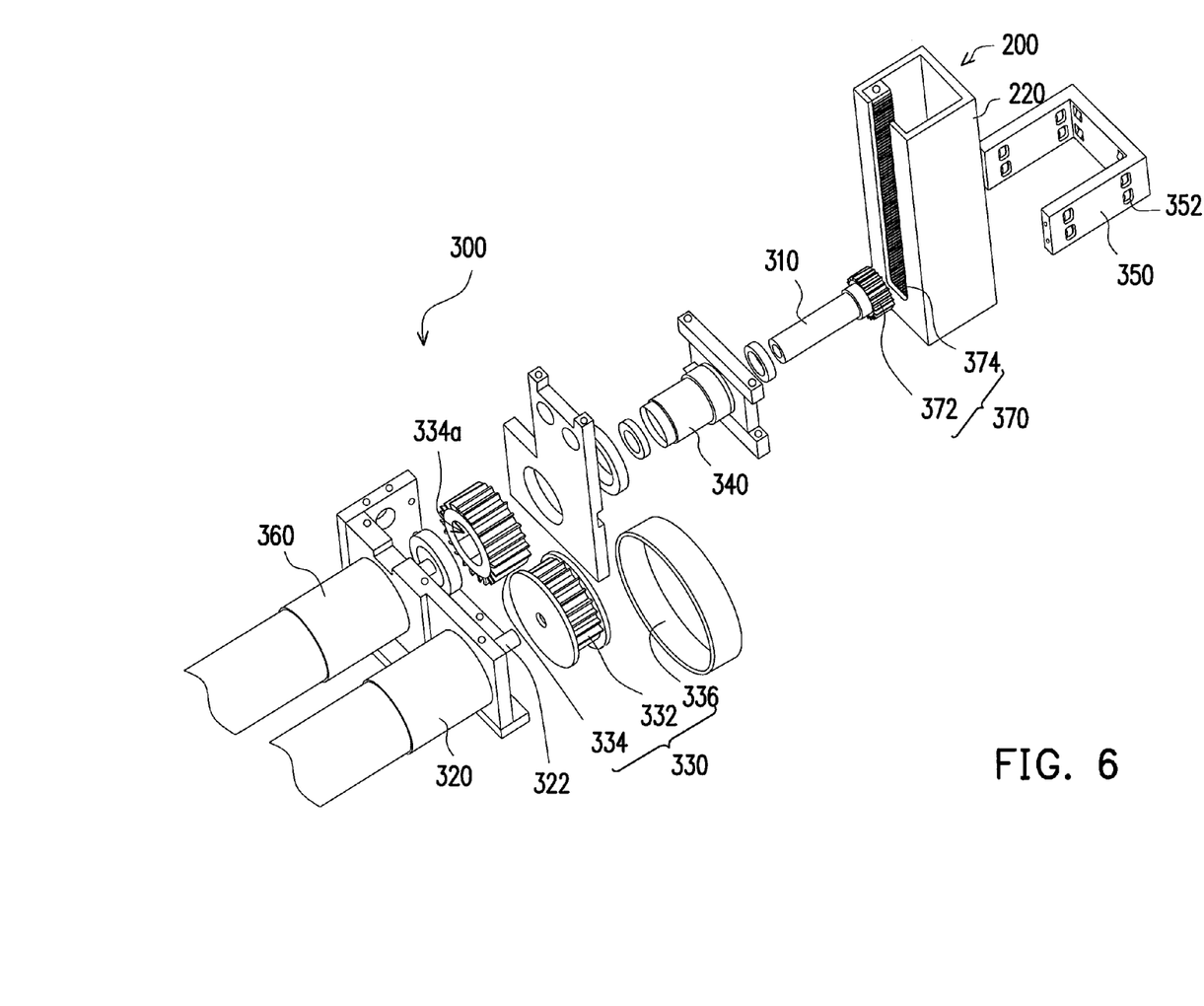
FIG. 6 is an exploded view showing the structure of FIG. 5.

FIG. 5 is a schematic view showing a hybrid leg-wheel and a driving mechanism according to one embodiment of the present invention. FIG. 6 is an exploded view showing the structure of FIG. 5. Referring to FIGS. 5 and 6, some detailed parts of the hybrid leg-wheel 200 and the driving mechanism 300 are not shown for clearly illustrating the connection relationship there between.

In this embodiment, the driving mechanism 300 further comprises a first driver 320 and a transmission module 330. The first driver 320 is disposed on the body 110. The transmission module 330 is connected between the first driver 320 and the hybrid leg-wheel 200. The first driver 320 drives the hybrid leg-wheel 200 rotating along the driving axle 310 by the transmission module 330.

Particularly, the first driver 320 is located beside the driving axle 310. In addition, the transmission module 330 comprises an active wheel 332, a passive wheel 334 and a transmission unit 336. The active wheel 332 is disposed at an output terminal 322 of the first driver 320 and thereby driven by the first driver 320. The passive wheel 334 connects the hybrid leg-wheel 200, while the transmission unit 336 connects the active wheel 332 and the passive wheel 334. In addition, the passive wheel 334 has a through hole 334a, and the driving axle 310 passes through the through hole 334a.

The transmission unit 336 drives the hybrid leg-wheel 200 via the passive wheel 334, while the first driver 320 drives the transmission unit 336 via the active wheel 332. In this embodiment, the transmission unit 336 may be a belt, a chain, a gear, a wire rope or other equivalent devices. However, the above mentioned transmission module 300 embodied as the combination of the active wheel 332, the passive wheel 336 and the transmission unit 336 serves only as an example. Alternatively, other mechanisms such as linkages, cams or other equivalent mechanical components may be used to obtain the same or similar effect.

In this embodiment, the driving mechanism 300 further comprises a sleeve 340 and a coupler 350. The sleeve 340 connects the passive wheel 334 of the transmission module 330 and is disposed around the driving axle 310. The coupler 350 is coupled to the hybrid leg-wheel 200 and the sleeve 340. In this embodiment, the sleeve 340 and the coupler 350 are engaged and fixed with each other. Therefore, when the transmission module 330 drives the sleeve 340 rotating relative to the driving axle 310 via the first driver 320, the coupler 350 rotates accordingly and thereby drives the hybrid leg-wheel 200 rotating together with the sleeve 340 synchronously.

In addition, according to this embodiment, the driving mechanism 300 further comprises a second driver 360 and a transforming module 370. The second driver 360 is disposed on the body 110 and connected to the driving axle 310. Preferably, the second driver 360 and the first driver 320 are arranged side by side. Furthermore, the transforming module 370 is coupled between the hybrid leg-wheel 200 and the driving axle 310. And, the transforming module 370 comprises a gear 372 and a rack 374.

Specifically, the gear 372 is connected to an end of the driving axle 310, while the rack 374 is disposed on the hybrid leg-wheel 200 and engaged with the gear 372. When the second driver 360 drives the driving axle 310 to rotate the gear 372, the rack 374 can be driven by the gear 372 to translate relative to the driving axle 310. Thereby, the hybrid leg-wheel 200 can be driven by the rack 374 to move upwardly or downwardly relative to the coupler 350 along a direction perpendicular to the axis of the driving axle 310. In other words, the gear 372 and the rack 374 can transform the rotation of the driving axle 310 into a linear translation of the hybrid leg-wheel 200 relative to the driving axle 310, and thereby provide the hybrid leg-wheel 200 with the translational degree of freedom perpendicular to the axis of the driving axle 310.

However, the above mentioned transforming module 370 embodied as the gear 372 and the rack 374 serves only as an example. Alternatively, other mechanisms such as the combination of a guide screw and a slider, the combination of a wire rope and a slider, or other equivalent combinations of mechanical components may be used to obtain the same or similar effect.

In addition, to make the hybrid leg-wheel 200 smoothly sliding relative to the coupler 350, at least an interfacial component 352 can be provided between the coupler 350 and the hybrid leg-wheel 200. The interfacial component 352 may be a bearing, such as a ball bearing, a cylindrical roller bearing, a needle roller bearing, a sliding bearing or other equivalent components to lean against the hybrid leg-wheel 200.

Figure 7:
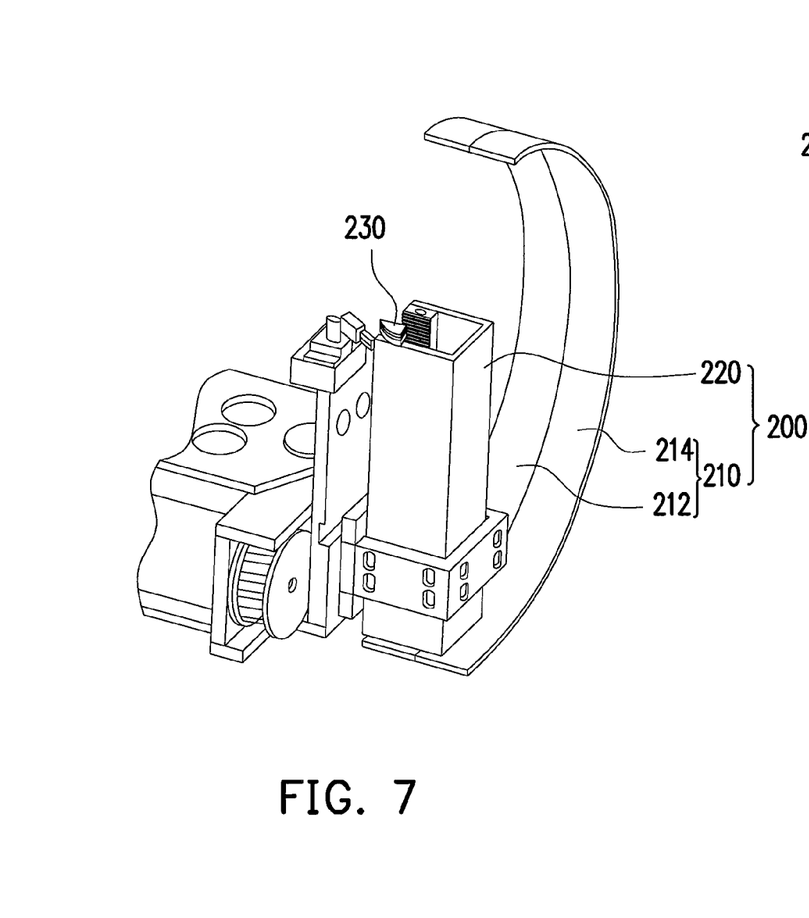
FIG. 7 is a schematic view showing a hybrid leg-wheel and a driving mechanism according to an embodiment of the present invention.
Figure 8:
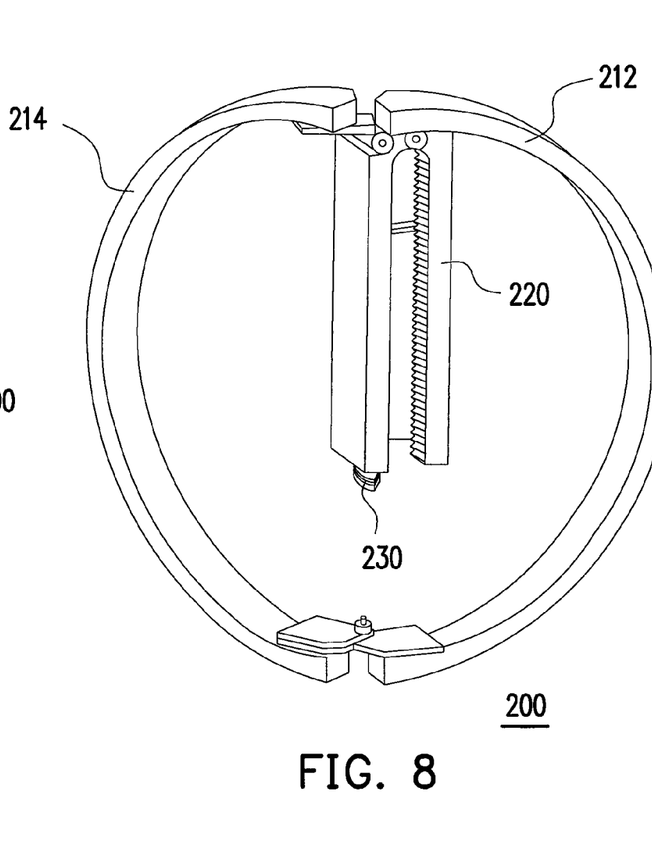
FIG. 8 is a schematic view showing the hybrid leg-wheel in FIG. 7.

FIG. 7 is a schematic view showing a hybrid leg-wheel and a driving mechanism according to an embodiment of the present invention. FIG. 8 is a schematic view showing the hybrid leg-wheel in FIG. 7. Referring to FIGS. 7 and 8, the hybrid leg-wheel 200 comprises a rim segment 210 and a spoke 220. The spoke 220 is connected between the rim segment 210 and the driving mechanism 300. Preferably, an extending direction of the spoke 220 is substantially perpendicular to the axis of the driving axle 310. Herein, the rim segment 210 comprises a first segment 212 and a second segment 214. The rim segment 210 can be switched to a wheel profile by expanding the first segment 212 and the second segment 214 to be coplanar. In addition, the rim segment 210 can be switched to a leg profile by retracting the first segment 212 and the second segment 214 with each other.

The first segment 212 and the second segment 214 are expanded to form a rim having a closed profile, and two ends of the spoke 220 are respectively located at an edge of the rim and a center of the rim. In this embodiment, the first segment 212 and the second segment 214 are respectively a semicircular segment, whereby the rim segment 210 becomes a full circular rim as the wheel profile, while the rim segment 210 becomes a semicircular rim as the leg profile.

Furthermore, to accomplish the switch between the wheel profile and the leg profile of the rim segment 210, two ends of the first segment 212 are respectively pivoted to the two ends of the second segment 214. When the rim segment 210 transforms between the leg profile and the wheel profile, the second segment 214 rotates relative to the first segment 212 along an axis L passing through the two pivots. In addition, the first segment 212 is fixed on the spoke 220, and the hybrid leg-wheel 200 further comprises an actuator 230 disposed on the spoke 220 and connected to the second segment 214 to drive the second segment 214 moving relative to the first segment 212.

Referring further to FIG. 2, the two ends of the spoke 220 are located on a point P of the circumference and a center Q, and therefore when the rim segment 210 is switched to the wheel profile, the rotation radius of the hybrid leg-wheel 200 along the driving axle 310 is equal to the length of the spoke 220. At this time, the most effective planar movement output from the hybrid leg-wheel 200 is obtained.

Referring further to FIG. 4, when the rim segment 210 is switched to the leg profile, the first segment 212 and the second segment 214 are pivoted and retracted with each other. The spoke 220 can perform both of the linear translation and the rotation relative to the driving axle 310, so as to driven the mobile platform in leg-motivation mode to move on an uneven work surface, such as stairs.

It is noted that the rim segment 210 may also performs both of the rotation and the linear translation in the wheel profile. In other words, when the mobile platform 10 is in the leg-motivation mode, the rim segment 210 is not limited to leg profile or wheel profile. Furthermore, the present invention provides no limitation to the contour of the rim segment. Except circular, the rim segment may be rectangular or shaped in other applicable contour.

Figure 9A:
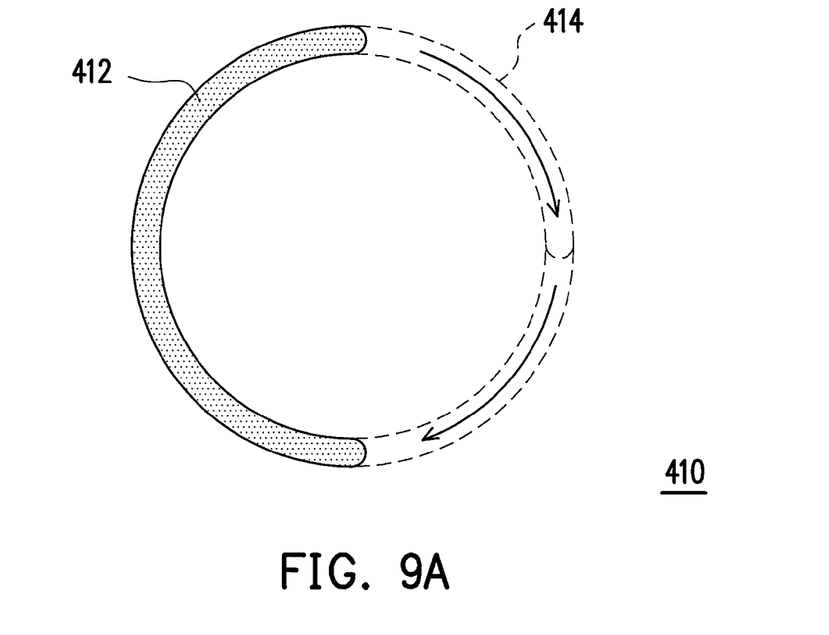
FIGS. 9A and 9B are schematic views showing a rim segment according to another embodiment of the present invention.
Figure 9B:
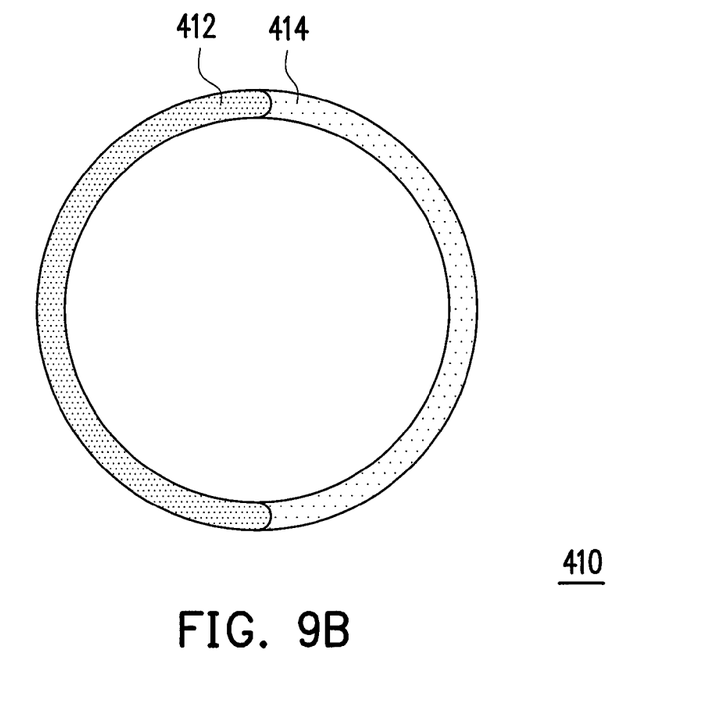

In other embodiments, different mechanical designs can be adopted to accomplish the profile switch of the hybrid leg-wheel 200. FIGS. 9A and 9B are schematic views showing a rim segment according to another embodiment of the present invention. Referring to FIGS. 9A and 9B, the rim segment 410 comprises a first segment 412 and a second segment 414. Compared with the aforementioned rim segment 210, the presently illustrated rim segment 410 accomplishes the leg/wheel switch by the relative sliding between the first segment 412 and the second segment 414. In other words, the second segment 414 slides relative to the first segment 412 along the outline of the first segment 412. Specifically, when the rim segment 410 is switched from the leg profile of FIG. 9A to the wheel profile of FIG. 9B, an end of the second segment 414 is driven by an actuator and thereby slides out of the first segment 412, to form a full circular rim segment 410.

Figure 10A:
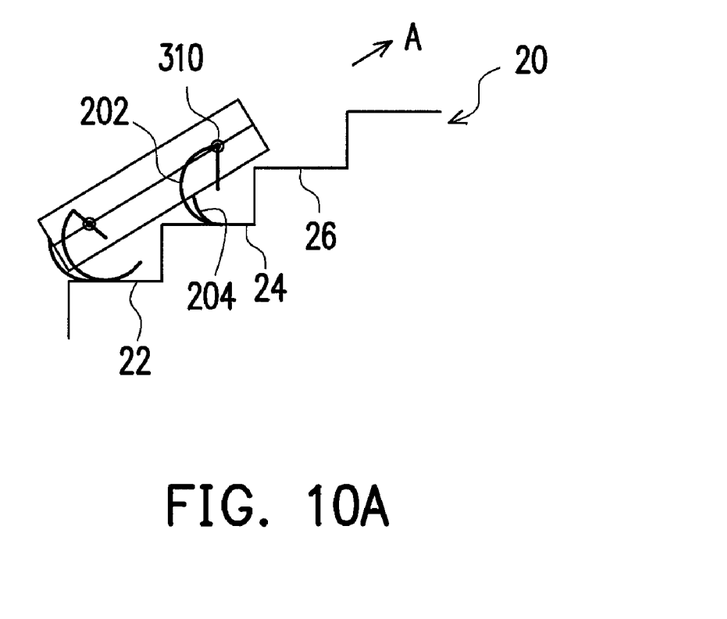
FIGS. 10A through 10C are schematic diagrams showing a mobile platform climbing stairs according to an embodiment of the present invention.
Figure 10B:
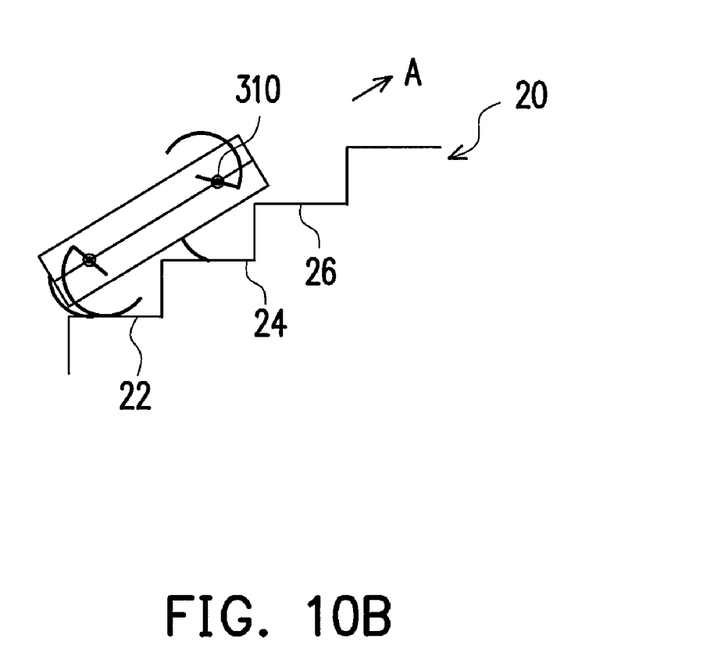
Figure 10C:
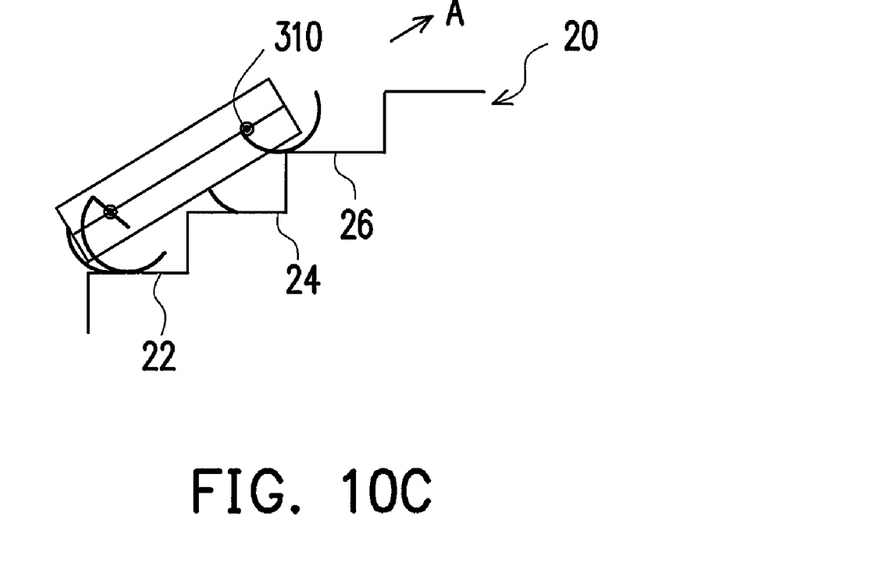

FIGS. 10A through 10C are schematic diagrams showing a mobile platform climbing stairs according to an embodiment of the present invention. Referring further to the content of the above embodiments, the working surface 20 of this embodiment has stairs including floors 22, 24 and 26 in different altitudes.

Firstly, as shown in FIGS. 10A and 10B, when the mobile platform 10 climbs the stairs 20 along the direction A, the hybrid leg-wheel 202 on the floor 24 can be driven by the driving mechanism 300 to rotate clockwise along the axis of the driving axle 310 and then leave from the floor 24. At this time, the other hybrid leg-wheel 204 on the floor 24 supports the body 100 together with the two hybrid leg-wheels 206 and 208 on the floor 22.

Then, the hybrid leg-wheel 202 is driven by the driving mechanism 300 to translate relative to the driving axle 310 and approach the floor 26. After that, as shown in FIG. 10C, the hybrid leg-wheel 202 rotates along the axis of the driving axle 310 until contacts the floor 26. Thereby, the hybrid leg-wheel 202 moves from floor 24 to floor 26. Similarly, the hybrid leg-wheels 204, 206 and 208 can be driven in the same manner, so as to carry the body 110 from floor 24 to floor 26, and thereby the stair climbing function of the mobile platform 10 is accomplished.

Figure 11:
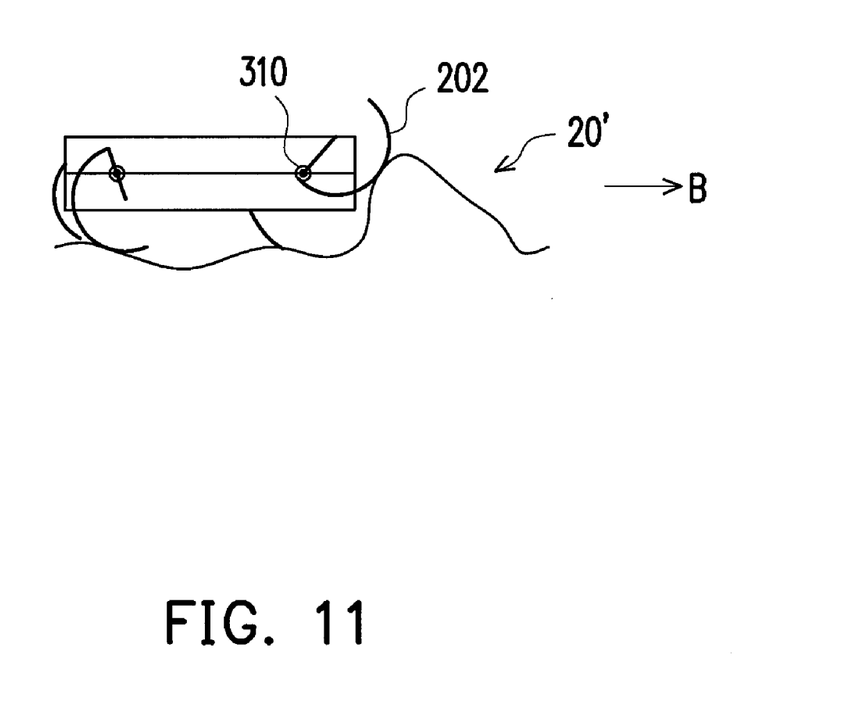
FIG. 11 is a schematic diagram showing a mobile platform moving on a working surface according to an embodiment of the present invention.

Furthermore, the mobile platform of the present invention can move on other types of working surfaces. This will be discussed with reference to the following embodiment. FIG. 11 is a schematic diagram showing a mobile platform moving on a working surface according to an embodiment of the present invention. Referring to FIG. 11, the working surface 20' is an uneven ground.

When the mobile platform 11 move along the direction B, the hybrid leg-wheel 202 can be driven by the driving mechanism 300 to rotate clockwise along the axis of the driving axle 310 and then leave from the working surface 20". At this time, the other hybrid leg-wheels 204, 206 and 208 on the working surface 20' together support the body 100. Then, the hybrid leg-wheel 202 is driven by the driving mechanism 300 to translate relative to the driving axle 310 and contact the floor 20' again. Similarly, the hybrid leg-wheels 204, 206 and 208 can be respectively driven to rotate along the axes of their corresponding driving axles 310, and thereby the body 110 can be carried by the hybrid leg-wheels 202, 204, 206 and 208 to move on the working surface 20'.

A steering system can be further integrated into the mobile platform of the present invention, to turn the moving direction of the mobile platform on a plane.

Figure 12:
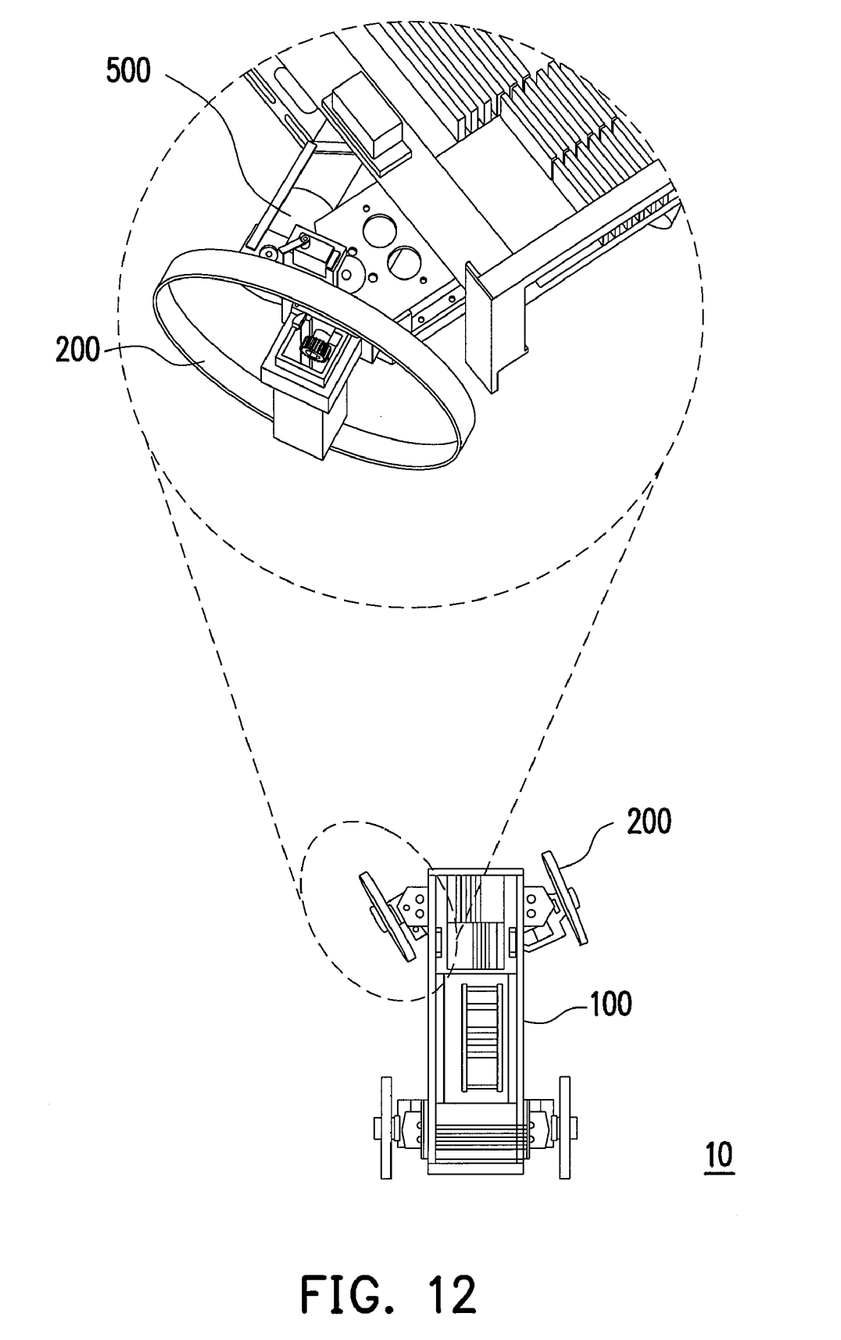
FIG. 12 is a top view of a mobile platform according to an embodiment of the present invention.

FIG. 12 is a top view of a mobile platform according to an embodiment of the present invention. Referring to FIG. 12, the mobile platform 10 further comprises a plurality of steering mechanisms 500, which are respectively disposed between the driving mechanisms 300 and the body 100 for adjusting an included angle between each hybrid leg-wheel 200 and the corresponding driving axle 310. Therefore, the mobile platform 10 can performs not only a linear moving but also a left turn or a right turn, to comply with practical moving requirements. The steering mechanism 500 herein can be the steering system adopted by the present wheel vehicle or other applicable steering systems.

In brief, the mobile platform of the present invention can be switched into wheel-motivation mode or leg-motivation mode in accordance with various terrains and moving requirements, which not only accomplishes stable and rapid movement on a plane but also provides high adaptability with respect to uneven terrains. Various types of hybrid leg-wheels are also proposed to be accompanied with the leg-motivation mode or the wheel-motivation mode of the mobile platform, so as to optimize the moving efficiency of the mobile platform. Owing to the simple mechanism for providing the hybrid leg-wheel with independent rotational and translational degree of freedoms, the production cost can be reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A mobile platform, comprising:
a body;
a plurality of hybrid leg-wheels, disposed around the body for carrying the body moving on a working surface; and
a plurality of driving mechanisms, disposed between the corresponding hybrid leg-wheels and the body, wherein each driving mechanism includes a driving axle connecting the corresponding hybrid leg-wheels and the body, each driving mechanism provides the corresponding hybrid leg-wheel a rotational degree of freedom and a translational degree of freedom, the rotational degree of freedom and the translational degree of freedom are driven independently, the rotational degree of freedom allows the hybrid leg-wheels rotating along an axis of the driving axle, the translational degree of freedom allows the hybrid leg-wheels translating relative to the driving axle, and the direction of the axis is substantially perpendicular to the translational direction.

2. The mobile platform as claimed in claim 1, wherein each driving mechanism comprises:
a first driver, disposed on the body; and
a transmission module, connected between the first driver and the corresponding hybrid leg-wheel, wherein the first driver drives the hybrid leg-wheel to rotate by the transmission module.

3. The mobile platform as claimed in claim 2, wherein the first driver is located beside the driving axle, and each transmission module comprises:
an active wheel, disposed at an output terminal of the corresponding first driver;
a passive wheel, provided with a through hole, the passive wheel connecting the corresponding hybrid leg-wheel to drive the hybrid leg-wheel rotating; and
a transmission unit, connecting the active wheel and the passive wheel.

4. The mobile platform as claimed in claim 3, wherein the transmission unit comprises a belt, a chain, a gear or a wire rope.

5. The mobile platform as claimed in claim 2, wherein each driving mechanism further comprises:
a sleeve, connected to the transmission module and disposed around the driving axle, wherein the transmission module drives the sleeve rotating relative to the driving axle; and
a coupler, coupled to the corresponding hybrid leg-wheel and the sleeve, wherein the sleeve drives the hybrid leg-wheel rotating synchronously through the coupler, and the hybrid leg-wheel has the translational degree of freedom relative to the coupler.

6. The mobile platform as claimed in claim 5, further comprising an interfacial component disposed between each coupler and the corresponding hybrid leg-wheel.

7. The mobile platform as claimed in claim 6, wherein the interfacial component comprises a plurality of bearings respectively disposed on the couplers and leaned against the corresponding hybrid leg-wheels.

8. The mobile platform as claimed in claim 7, wherein the bearings comprise ball bearings, cylindrical roller bearings, needle roller bearings or sliding bearings.

9. The mobile platform as claimed in claim 1, wherein each driving mechanism further comprises:
a second driver, disposed on the body and connected to the driving axle to drive the driving axle rotating; and
a transforming module, coupled between the corresponding hybrid leg-wheel and the driving axle for transforming the rotation of the driving axle into a linear translation of the hybrid leg-wheel relative to the driving axle.

10. The mobile platform as claimed in claim 9, wherein each transforming module comprises:
a gear, connected to a terminal of the driving axle; and
a rack, disposed on the hybrid leg-wheel and engaged with the gear.

11. The mobile platform as claimed in claim 1, wherein each hybrid leg-wheel comprises:
a rim segment; and
a spoke, connected between the rim segment and the corresponding driving mechanism, wherein the rotational degree of freedom allows the spoke rotating along the axis of the driving axle, and the translational degree of freedom allows the spoke translating relative to the driving axle.

12. The mobile platform as claimed in claim 11, wherein an extending direction of each spoke is substantially perpendicular to the axis of the driving axle.

13. The mobile platform as claimed in claim 11, wherein each rim segment comprises a first segment and a second segment, configured in switching the rim segment to a wheel profile by expanding the first segment and the second segment to be coplanar or switching the rim segment to a leg profile by retracting the first segment and the second segment with each other.

14. The mobile platform as claimed in claim 13, wherein the first segment and the second segment are respectively a semicircular segment, whereby the rim segment becomes a full circular rim as the wheel profile, while the rim segment becomes a semicircular rim as the leg profile.

15. The mobile platform as claimed in claim 13, wherein two ends of the first segment are respectively pivoted to the two ends of the second segment, and when the rim segment transforms between the leg profile and the wheel profile, the second segment rotates relative to the first segment along an axis passing through the two pivots.

16. The mobile platform as claimed in claim 13, wherein the second segment is slidably coupled to the first segment, and when the rim segment transforms between the leg profile and the wheel profile, the second segment slides relative to the first segment along the outline of the first segment.

17. The mobile platform as claimed in claim 13, wherein the first segment and the second segment are expanded to form a rim having a closed profile, and two ends of the spoke are respectively located at an edge of the rim and a center of the rim.

18. The mobile platform as claimed in claim 13, wherein the first segment is fixed on the spoke, and each hybrid leg-wheel further comprises an actuator disposed on the spoke and connected to the second segment to drive the second segment moving relative to the first segment.

19. The mobile platform as claimed in claim 1, further comprising a plurality of steering mechanisms, respectively disposed between the driving mechanisms and the body for adjusting an included angle between each hybrid leg-wheel and the corresponding driving axle.

* * * * *